United States Patent
Takeuchi et al.

(10) Patent No.: US 11,912,857 B2
(45) Date of Patent: Feb. 27, 2024

(54) PHOTOCURABLE GASKET RESIN COMPOSITION FOR HARD DISK DRIVE AND HARD DISK DRIVE

(71) Applicant: Nidec Corporation, Kyoto (JP)

(72) Inventors: Taku Takeuchi, Kyoto (JP); Naoko Kashiwa, Kyoto (JP); Arata Isai, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 556 days.

(21) Appl. No.: 17/179,472

(22) Filed: Feb. 19, 2021

(65) Prior Publication Data

US 2021/0269632 A1 Sep. 2, 2021

(30) Foreign Application Priority Data

Feb. 28, 2020 (JP) ................. 2020-033783

(51) Int. Cl.
- *C08F 2/46* (2006.01)
- *C08F 2/50* (2006.01)
- *C08G 61/04* (2006.01)
- *C08L 51/04* (2006.01)

(52) U.S. Cl.
CPC ................... *C08L 51/04* (2013.01)

(58) Field of Classification Search
CPC ............ C08F 290/042; C08F 220/1811; C08F 220/1808; C08L 51/003; C08L 51/04
USPC .................. 522/43, 33, 6, 189, 184, 1; 520/1
See application file for complete search history.

(56) References Cited

FOREIGN PATENT DOCUMENTS

| JP | 2008-069302 A | 3/2008 | |
| WO | WO-2014119340 A1 * | 8/2014 | ............... C08F 2/48 |

OTHER PUBLICATIONS

Kurata et al, WO 2014119340 Machine Translation, Aug. 7, 2014 (Year: 2014).*

* cited by examiner

*Primary Examiner* — Jessica Whiteley
(74) *Attorney, Agent, or Firm* — Keating & Bennett, LLP

(57) ABSTRACT

A photocurable gasket resin composition for use in a hard disk drive contains an acryloyl-terminated polyisobutylene, a monofunctional alkyl (meth)acrylate monomer, a polyethylene powder, a phosphate ester, a polyfunctional secondary thiol, a thixotropy-imparting agent, and a photopolymerization initiator. The monofunctional alkyl (meth)acrylate monomer contains a chain skeleton alkyl (meth)acrylate of C8 to C18 and dicyclopentenyl acrylate. The thixotropy-imparting agent contains a compound (f1) derived from castor oil.

7 Claims, No Drawings

PHOTOCURABLE GASKET RESIN COMPOSITION FOR HARD DISK DRIVE AND HARD DISK DRIVE

CROSS REFERENCE TO RELATED APPLICATION

The present invention claims priority under 35 U.S.C. § 119 to Japanese Patent Application No. 2020-033783 filed on Feb. 28, 2020, the entire contents of which are hereby incorporated herein by reference.

1. FIELD OF THE INVENTION

The present disclosure relates to a photocurable gasket resin composition for a hard disk drive and a hard disk drive.

2. BACKGROUND

Generally, a housing member of a precision electronic device is sealed with a sealing member for sealing in order to protect internally stored parts from external dust, moisture and the like. Characteristics required for the sealing member for sealing vary depending on the application of the device. For example, in a case of a sealing member for sealing used for a hard disk drive (hereinafter referred to as HDD), characteristics such as sealing property against outside air and characteristics that the sealing member for sealing is unlikely to generate outgas are required. Examples of the outgas include chlorine and a siloxane component. Chlorine, siloxane components, and the like reduce long-term reliability of the HDD.

Examples of the sealing member for sealing include a "form-in-place type gasket". As a method of using the "form-in-place type gasket", an uncured liquid substance is applied to a portion to be sealed and cured.

CIPG (Cured In Place Gasket) is known as the "form-in-place type gasket". As a method of using CIPG, a curable resin is applied to only one of members to be bonded together and cured, and then the other member is bonded.

The progress of a HDD structure is remarkable. For example, in order to increase a recording capacity per unit area, a technique of sealing helium gas instead of air inside the HDD has been put into practical use. When helium gas is sealed inside the HDD, helium gas is likely to leak from the sealing member for sealing. Thus, the sealing member for sealing is required to have higher sealing property.

SUMMARY

One aspect of an example embodiment of the present disclosure is a photocurable gasket resin composition for a hard disk drive containing an acryloyl-terminated polyisobutylene (A), a monofunctional alkyl (meth)acrylate monomer (B), a polyethylene powder (C), a phosphate ester (D), a polyfunctional secondary thiol (E), a thixotropy-imparting agent (F), and a photopolymerization initiator (G).

In another aspect of an example embodiment of the present disclosure, the (B) contains a chain skeleton alkyl (meth)acrylate (b1) of C8 to C18 and dicyclopentenyl acrylate (b2). The (F) contains a compound (f1) derived from castor oil.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described.

The photocurable gasket resin composition for a hard disk drive (hereinafter, may be abbreviated as a resin composition for HDD) of the present disclosure contains an acryloyl-terminated polyisobutylene (A) (hereinafter referred to as the (A) component).

The (A) component is a base oligomer of a resin composition for HDD. The (A) component is not particularly limited as long as it is a polymer having a polyisobutylene skeleton containing —[$CH_2C(CH_3)_2$]— unit.

The (A) component has high curability upon light irradiation and is excellent in heat resistance and weather resistance. Further, the (A) component has a higher tensile breaking strain than that of an oligomer having a butadiene-based skeleton. Furthermore, the (A) component has high gas barrier properties and low water vapor permeability.

The viscosity of the (A) component is preferably 100 Pa·s or more and 10,000 Pa·s or less, more preferably 500 Pa·s or more and 5,000 Pa·s or less, and particularly preferably 1,000 Pa·s or more and 4,000 Pa·s or less. A method of measuring the viscosity is a measurement method using an E-type viscometer at 23° C.

When the viscosity of the (A) component is 100 Pa·s or more, a cohesive force of the resin composition for HDD is high. When the viscosity of the (A) component is 10,000 Pa·s or less, it is easy to adjust the viscosity of the resin composition for HDD to a viscosity suitable for work. The work is to discharge the resin composition for HDD using a coating machine. The viscosity suitable for work is a viscosity at which a designated amount of the resin composition for HDD can be discharged and the resin composition for HDD is unlikely to drip after application. Examples of the commercially available (A) component include EP400V (trade name: manufactured by Kaneka Corporation). EP400V is a bi-terminal acryloyloxy group polyisobutylene. The viscosity of EP400V is 3,500 Pa·s at 23° C.

The mass ratio of the (A) component to a total solid content of the resin composition for HDD is preferably 8% by mass or more and 80% by mass or less, and more preferably 10% by mass or more and 75% by mass or less.

When the mass ratio of the (A) component to the total solid content of the resin composition for HDD is 8% by mass or more, the resin composition for HDD has higher gas barrier properties and a lower moisture permeability. When the mass ratio of the (A) component to the total solid content of the resin composition for HDD is 80% by mass or less, it is easy to adjust the viscosity of the resin composition for HDD to the viscosity suitable for work.

The resin composition for HDD of the present disclosure contains a monofunctional alkyl (meth)acrylate monomer (B) (hereinafter referred to as the (B) component).

The (B) component dilutes the (A) component. Furthermore, the (B) component improves photocuring reactivity of the resin composition for HDD.

The mass ratio of the (B) component to a total solid content of the resin composition for HDD is preferably 5% by mass or more and 60% by mass or less, and more preferably 6% by mass or more and 55% by mass or less.

When the mass ratio of the (B) component to the total solid content of the resin composition for HDD is 5% by mass or more, the curability of the resin composition for HDD is higher. When the mass ratio of the (B) component to the total solid content of the resin composition for HDD is 60% by mass or less, the resin composition for HDD has higher gas barrier properties and a lower moisture permeability.

Examples of the (B) component include a chain skeleton alkyl (meth)acrylate (b1) of C8 to C18 (hereinafter referred to as the (b1) component) and dicyclopentenyl acrylate (b2) (hereinafter referred to as the (b2) component).

The (b1) component is a component that has a good balance between curability and flexibility. When the resin composition for HDD contains the (b1) component, the sealing property of the resin composition for HDD is higher.

C8 to C18 means that the number of carbon atoms constituting the main chain is 8 or more and 18 or less. When the number of carbon atoms constituting the main chain is 8 or more, flexibility of a cured product of the resin composition for HDD is high. When the number of carbon atoms constituting the main chain is 18 or less, the curability of the resin composition for HDD is high.

Examples of the (b1) component include 2-ethylhexyl (meth)acrylate, octyl (meth)acrylate, nonyl (meth)acrylate, decyl (meth)acrylate, lauryl (meth)acrylate, tridecyl (meth)acrylate, tetradecyl (meth)acrylate, and stearyl (meth)acrylate.

The (b1) component may be composed of only one kind or a mixture of two or more kinds of these components. As the (b1) component, n-octyl acrylate is preferable. Tg of n-octyl acrylate is low. n-octyl acrylate has good compatibility with the (A) component.

The mass ratio of the (b1) component to a total mass of the (B) component is preferably 20% by mass or more and 80% by mass or less, more preferably 30% by mass or more and 60% by mass or less, and particularly preferably 35% by mass or more and 50% by mass or less.

When the mass ratio of the (b1) component to the total mass of the (B) component is 20% by mass or more, the resin composition for HDD has higher gas barrier properties and a lower moisture permeability. When the mass ratio of the (b1) component to the total mass of the (B) component is 80% by mass or less, rigidity of the resin composition for HDD is higher.

The (b2) component is a component with high rigidity. The (b2) component is an alicyclic compound. The (b2) component enhances an elastic modulus of a cured film of the resin composition for HDD. When the resin composition for HDD contains the (b2) component, the resin composition for HDD is unlikely to generate outgas as compared with a case where the resin composition for HDD contains another alicyclic monofunctional (meth)acrylate instead of the (b2) component. Examples of other alicyclic monofunctional (meth)acrylates include isobornyl acrylates. Examples of outgas include camphene.

The mass ratio of the (b2) component to the total mass of the (B) component is preferably 20% by mass or more and 80% by mass or less, more preferably 40% by mass or more and 70% by mass or less, and particularly preferably 50% by mass or more and 65% by mass or less.

When the mass ratio of the (b2) component to the total mass of the (B) component is 20% by mass or more, rigidity of the resin composition for HDD is higher. When the mass ratio of the (b2) component to the total mass of the (B) component is 80% by mass or less, the resin composition for HDD has higher gas barrier properties and a lower moisture permeability.

The resin composition for HDD of the present disclosure contains a polyethylene powder (C) (hereinafter referred to as the (C) component). The (C) component suppresses stickiness on a surface of the cured film of the resin composition for HDD and reduces a coefficient of dynamic friction on the surface of the cured film.

The (C) component is preferably an ultra-high molecular weight polyethylene having a molecular weight of 1 million or more and 7 million or less. When the (C) component is an ultra-high molecular weight polyethylene, the abrasion resistance and self-lubricating property of the resin composition for HDD are higher.

An average particle size of the (C) component is preferably 10 µm or more and 60 µm or less, and more preferably 15 µm or more and 40 µm or less. A method of measuring the average particle size of the (C) component is a coulter counter method. When the average particle size of the (C) component is 10 µm or more and 60 µm or less, surface roughness of the cured product of the resin composition for HDD can be made finer.

The mass ratio of the (C) component to the total solid content of the resin composition for HDD is preferably 5% by mass or more and 35% by mass or less, more preferably 7% by mass or more and 30% by mass or less, and particularly preferably 10% by mass or more and 25% by mass or less.

When the mass ratio of the (C) component to the total solid content of the resin composition for HDD is 5% by mass or more, slipperiness on the surface of the cured product of the resin composition for HDD further increases, and the coefficient of dynamic friction further decreases. When the mass ratio of the (C) component to the total solid content of the resin composition for HDD is 35% by mass or less, the hardness and distortion characteristics of the cured product of the resin composition for HDD are within a suitable range. Examples of commercially available products of the (C) component include Miperon (trade name: manufactured by Mitsui Chemicals, Inc.). Miperon is an ultra-high molecular weight polyethylene.

The resin composition for HDD of the present disclosure contains a phosphate ester (D) (hereinafter referred to as the (D) component). The (D) component enhances adhesion between the resin composition for HDD and a metal material. The (D) component improves storage stability of the resin composition for HDD.

The (D) component preferably has a photoreactive functional group in the molecule. When the (D) component has a photoreactive functional group in the molecule, it is possible to suppress that the (D) component volatilizes from the cured film of the resin composition for HDD as time passes.

The mass ratio of the (D) component to the total solid content of the resin composition for HDD is preferably 0.1% by mass or more and 3.0% by mass or less, and more preferably 0.3% by mass or more and 2.0% by mass or less. When the mass ratio of the (D) component to the total solid content of the resin composition for HDD is 0.1% by mass or more and 3.0% by mass or less, the storage stability of the resin composition for HDD is improved. Examples of commercially available products of the (D) component include KAYAMER PM-2 and PM-21 (trade names: both manufactured by Nippon Kayaku Co., Ltd.).

The resin composition for HDD of the present disclosure contains a polyfunctional secondary thiol (E) (hereinafter referred to as the (E) component). The (E) component improves photoreactivity of the resin composition for HDD. The (E) component increases breaking strain in the cured film of the resin composition for HDD.

The (E) component is capable of causing an enthiol reaction. The (E) component can suppress inhibition of curing of the resin composition for HDD by oxygen by causing the enthiol reaction. Since the (E) component is a secondary thiol, reactivity and storage stability are well balanced. When the resin composition for HDD contains a primary thiol instead of the (E) component, the reactivity of the resin composition for HDD becomes too high, and the preservation of the resin composition for HDD in a high temperature environment deteriorates.

Examples of the (E) component include a bifunctional (E) component, a trifunctional (E) component, and a tetrafunctional (E) component. Examples of the bifunctional (E) component include 1,4 bis(3-mercaptobutylyloxy)butane. Examples of the trifunctional (E) component include 1,3,5 tris(3-mercaptobutyryloxyethyl)-1,3,5-triazine-2,4,6-trione. Examples of the tetrafunctional (E) component include pentaerythritol tetrakis(3-mercaptobutyrate). The (E) component may be composed of only one kind or a mixture of two or more kinds of these components.

The mass ratio of the (E) component to a photo-curing component of the resin composition for HDD is preferably 0.5% by mass or more and 5.0% by mass or less, and more preferably 1.0% by mass or more and 4.0% by mass or less. The photo-curing component means a component having a photoreactive functional group. When the mass ratio of the (E) component to the photo-curing component of the resin composition for HDD is 0.5% by mass or more and 5.0% by mass or less, the photoreactivity of the resin composition for HDD is further improved. In addition, an elongation percentage of the cured film of the resin composition for HDD further increases.

Examples of commercially available products of the (E) component include KARENZ MT-BD1, NR1 and PE1 (trade names: all manufactured by Showa Denko K.K.).

The resin composition for HDD of the present disclosure contains a thixotropy-imparting agent (F) (hereinafter referred to as the (F) component). The (F) component imparts thixotropy to the uncured resin composition for HDD in a liquid state.

When a seal layer is formed on a member using the resin composition for HDD, for example, the uncured resin composition for HDD in a liquid state is applied onto the member to form a seal layer having a sufficient height. The seal layer preferably retains its shape during application until the seal layer cures.

The (F) component imparts thixotropy to the uncured resin composition for HDD in a liquid state, thereby facilitating the formation of a seal layer having a sufficient height. In addition, the (F) component facilitates retention of the shape of the seal layer.

Examples of the (F) component include an inorganic (F) component and an organic (F) component. Examples of the inorganic (F) component include silica and calcium carbonate. Examples of the organic (F) component include amide-based and castor oil-based components. The (F) component may be composed of only one kind or a mixture of two or more kinds of these components.

Examples of the (F) component include a compound (f1) derived from castor oil (hereinafter referred to as the (f1) component). The mass ratio of the (F) component to the total solid content of the resin composition for HDD is preferably 2% by mass or more and 10% by mass or less, and more preferably 3% by mass or more and 9% by mass or less. When the mass ratio of the (F) component to the total solid content of the resin composition for HDD is 2% by mass or more and 10% by mass or less, the thixotropy sufficient to form a seal layer having a required height can be imparted to the resin composition for HDD.

The (f1) component is a liquid thixotropy-imparting agent having good compatibility with the (A) component and the (B) component. When the (f1) component and the inorganic (F) component are used in combination, the thixotropy of the resin composition for HDD can be further enhanced.

The mass ratio of the (f1) component to a total mass of the (F) composition is preferably 20% by mass or more and 100% by mass or less, and more preferably 30% by mass or more and 100% by mass or less. When the mass ratio of the (f1) component to the total mass of the (F) component is 20% by mass or more and 100% by mass or less, the thixotropy of the resin composition for HDD can be further enhanced. Examples of commercially available products of the (f1) component include Rheocin (trade name: manufactured by BYK).

As the inorganic (F) component, hydrophobic fumed silica (f2) (hereinafter referred to as the (f2) component) is preferable. The (f2) component is, for example, surface-treated hydrophobic silica. The (f2) component has good compatibility with the (A) component and the (B) component.

An average primary particle size of the (f2) component is preferably 1 nm or more and 80 nm or less, more preferably 5 nm or more and 50 nm or less, and particularly preferably 10 nm or more and 30 nm or less.

Examples of commercially available products of the (f2) component include VP-NKC130 (trade name: manufactured by Nippon Aerosil Co., Ltd.). The primary average particle size of VP-NKC130 is 16 nm. A method of measuring the primary average particle size is a method of measuring the size of primary particles from an electron micrograph. VP-NKC130 is surface treated with n-hexadecane.

A thixotropic value (hereinafter referred to as the TI value) of the resin composition for HDD is preferably 2 or more, and more preferably 2.5 or more. When the TI value of the resin composition for HDD is 2 or more, it is possible to suppress dripping of the resin composition for HDD from immediately after application to curing, and to secure a sufficient thickness of the seal layer.

The resin composition for HDD of the present disclosure contains a photopolymerization initiator (G) (hereinafter referred to as the (G) component). The (G) component generates a radical by irradiation with ultraviolet rays, electron beams, or the like. The generated radical triggers a polymerization reaction.

Examples of the (G) component include a general-purpose photopolymerization initiator. Examples of general-purpose photopolymerization initiators include benzyl ketal-based photopolymerization initiators, acetophenone-based photopolymerization initiators, and phosphine-based photopolymerization initiators.

By arbitrarily selecting a light absorption wavelength of the (G) component, a wavelength of light that cures the resin composition for HDD can be selected. The wavelength of light that cures the resin composition for HDD can be selected from, for example, a wide wavelength range from an ultraviolet region to a visible light region.

Examples of the benzyl ketal-based (G) component include 2.2-dimethoxy-1.2-diphenylethane-1-one. Examples of the α-hydroxyacetophenone-based (G) component include 1-hydroxy-cyclohexyl-phenyl-ketone and 1-[4-(2-hydroxyethoxy)-phenyl]-2-hydroxy-2-methyl-1-propane-1-one.

Examples of the α-aminoacetophenone-based (G) component include 2-methyl-1-(4-methylthiophenyl)-2-morpholinopropan-1-one. Examples of the acylphosphine oxide-based (G) component include 2.4.6-trimethylbenzoyldiphenyl-phosphine oxide and bis(2.4.6-trimethylbenzoyl)-phenylphosphine oxide. The (G) component may be composed of only one kind or a mixture of two or more kinds of these components.

The resin composition for HDD preferably contains the α-hydroxyacetophenone-based (G) component. When the resin composition for HDD contains the α-hydroxyacetophenone-based (G) component, the resin composition for HDD is unlikely to turn yellow.

Examples of commercially available products of the α-hydroxyacetophenone-based (G) component include Omnirad 127, 184, and 2959 (trade name: manufactured by IGM Resins). A blending amount of the (G) component to 100 parts by mass of the photo-curing component of the resin composition for HDD is preferably 0.1 parts by mass or more and 10 parts by mass or less, and more preferably 0.5 parts by mass or more and 8 parts by mass or less.

The resin composition for HDD of the present disclosure preferably contains a polymerization inhibitor (H) (hereinafter referred to as the (H) component). When the resin composition for HDD contains the (H) component, the preservation of the resin composition for HDD is improved.

Examples of the (H) component include dibutylhydroxytoluene, t-butylhydroquinone, 4-t-butylpyrocatechol, and 1,4-benzoquinon. The (H) component may be composed of only one kind or a mixture of two or more kinds of these components.

The resin composition for HDD preferably contains dibutylhydroxytoluene. When the resin composition for HDD contains dibutylhydroxytoluene, the resin composition for HDD is unlikely to turn yellow.

A blending amount of the (H) component to 100 parts by mass of the photo-curing component is preferably 0.03 parts by mass or more and 0.5 parts by mass or less, and more preferably 0.05 parts by mass or more and 0.3 parts by mass or less.

The resin composition for HDD of the present disclosure preferably contains an antioxidant (I) (hereinafter referred to as the (I) component). The (I) component is a compound that efficiently traps a radical. When the resin composition for HDD contains the (I) component, the storage stability of the resin composition for HDD is improved.

Examples of the antioxidant (I) include hindered phenol-based (i1) (hereinafter referred to as the (i1) component) and hindered amine-based (i2) (hereinafter referred to as the (i2) component). The resin composition for HDD preferably contains either one or both of the (i1) component and the (i2) component.

The mass ratio of the (I) component to the total solid content of the resin composition for HDD is preferably 0% by mass or more and 3% by mass or less. When the resin composition for HDD contains the (I) component and the mass ratio of the (I) component is 3% by mass or less, the preservation of the resin composition for HDD is further improved.

A thickening rate is an index showing the preservation of the resin composition for HDD. The thickening ratio is a ratio of viscosity after leaving to stand to an initial viscosity of the resin composition for HDD. The viscosity after leaving to stand is the viscosity after leaving to stand at 60° C. for 3 days. The higher the preservation of the resin composition for HDD, the lower the thickening ratio. The thickening ratio of the resin composition for HDD is preferably 2.5 times or less, and more preferably 2 times or less.

The resin composition for HDD of the present disclosure may contain other additives, if necessary. Examples of other additives include reactive diluents, silane coupling agents, colorants, thermal polymerization initiators, defoaming agents, flame retardants, leveling agents, dispersants, and organic fine particles.

The resin composition for HDD of the present disclosure can be used, for example, as follows. The resin composition for HDD is applied onto a member. The member is, for example, a housing member of HDD. The applied resin composition for HDD is irradiated with light using a light source to cure the resin composition for HDD. The cured resin composition for HDD becomes a seal layer.

As the light source, for example, a known light source can be used. Examples of known light sources include high-pressure mercury lamps, medium-pressure mercury lamps, low-pressure mercury lamps, metal halide lamps, xenon lamps, LED lamps, and electrodeless ultraviolet lamps. Examples of light emitted by the light source include ultraviolet rays.

When ultraviolet rays are applied, ultraviolet irradiation intensity is preferably 50 mW/cm$^2$ or more and 3,000 mW/cm$^2$ or less. When ultraviolet rays are applied, an accumulated luminous quantity is preferably 500 mJ/cm$^2$ or more and 10,000 mJ/cm$^2$ or less.

The seal layer can be formed by using the resin composition for HDD of the present disclosure. A method of forming the seal layer is, for example, the method described in the method of using the resin composition for HDD.

The moisture permeability of the seal layer is preferably 40 g/m$^2$·24 h or less, and more preferably 30 g/m$^2$·24 h or less. The moisture permeability is the moisture permeability at 60° C. and 90% RH according to JIS Z 0208.

When the moisture permeability of the seal layer is 40 g/m$^2$·24 h or less, it is possible to prevent moisture and foreign matters from penetrating the seal layer. When the moisture permeability of the seal layer is 40 g/m$^2$·24 h or less, the resin composition for HDD is suitable as CIPG.

A type A hardness of the seal layer is preferably 6 or more and 50 or less, and more preferably 10 or more and 35 or less. The breaking strain of the seal layer is preferably 60% or more, and more preferably 100% or more. The elastic modulus of the seal layer is preferably 0.3 MPa or more and 10 MPa or less.

When the type A hardness, breaking strain, and elastic modulus of the seal layer are within the above ranges, followability of the seal layer to a laminating surface is good. As a result, the effect of the seal layer on dust prevention and internal gas leakage prevention becomes more remarkable. Therefore, when the type A hardness, breaking strain, and elastic modulus of the seal layer are within the above ranges, the resin composition for HDD is suitable as CIPG.

The resin composition for HDD of the present disclosure is excellent in preservation and has a low moisture permeability. By using the resin composition for HDD of the present disclosure, a stable sealing property can be ensured. A cured layer formed from the resin composition for HDD of the present disclosure is unlikely to generate outgas. Thus, reliability of HDD can be improved by using the resin composition for HDD of the present disclosure.

The production of the resin compositions for HDD of Examples and Comparative Examples will be described below. The resin compositions for HDD of Examples 1 to 11 were produced by mixing each component shown in Table 1 so as to have the blending amount shown in Table 1 and stirring until the components were uniformly dissolved.

In addition, the resin compositions for HDD of Comparative Examples 1 to 9 were produced by mixing each component shown in Table 2 so as to have the blending amount shown in Table 2 and stirring until the components were uniformly dissolved. The unit of the blending amount shown in Tables 1 and 2 is parts by mass.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| EP400V | (A) | 100.0 | 10.0 | 60.0 | 60.0 | 60.0 | 60.0 | 60.0 | 60.0 | 60.0 | 60.0 | 60.0 |
| UC-203 | | | | | | | | | | | | |
| TE-2000 | | | | | | | | | | | | |
| NOAA | (b1) | 4.0 | 20.0 | 20.0 | 10.0 | 40.0 | 20.0 | 20.0 | 20.0 | 20.0 | 20.0 | 20.0 |
| FA-511AS | (b2) | 6.0 | 30.0 | 30.0 | 40.0 | 10.0 | 30.0 | 30.0 | 30.0 | 30.0 | 30.0 | 30.0 |
| IB-XA | | | | | | | | | | | | |
| 4HBA | | | | | | | | | | | | |
| Miperon XM-220 | (C) | 20.0 | 20.0 | 20.0 | 20.0 | 20.0 | 10.0 | 40.0 | 20.0 | 20.0 | 20.0 | 20.0 |
| PM-21 | (D) | 1.0 | 1.0 | 1.0 | 1.0 | 1.0 | 1.0 | 1.0 | 1.0 | 1.0 | 1.0 | 1.0 |
| BD-1 | (E) | 2.0 | 2.0 | 2.0 | 2.0 | 2.0 | 2.0 | 2.0 | 2.0 | 2.0 | 2.0 | 2.0 |
| DPMP | | | | | | | | | | | | |
| Rheocin | (f1) | 3.0 | 3.0 | 3.0 | 3.0 | 3.0 | 3.0 | 3.0 | 3.0 | 3.0 | 3.0 | 3.0 |
| NKC130 | (f2) | 5.0 | 5.0 | 5.0 | 5.0 | 5.0 | 5.0 | 5.0 | 5.0 | 5.0 | 5.0 | |
| Omnirad184 | (G) | 3.0 | 3.0 | 3.0 | 3.0 | 3.0 | 3.0 | 3.0 | 3.0 | 3.0 | 3.0 | 3.0 |
| BHT | (H) | 0.1 | 0.1 | 0.1 | 0.1 | 0.1 | 0.1 | 0.1 | 0.1 | 0.1 | | 0.1 |
| Irganox1010 | (i1) | | | | | | | | 3.0 | | | |
| TINUVIN249 | (i2) | | | | | | | | | 1.0 | | |
| Total | | 144.1 | 94.1 | 144.1 | 144.1 | 144.1 | 134.1 | 164.1 | 147.1 | 145.1 | 144.0 | 139.1 |

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| EP400V | (A) | | | 60.0 | 60.0 | 60.0 | 60.0 | 60.0 | 60.0 | 60.0 |
| UC-203 | | 60.0 | | | | | | | | |
| TE-2000 | | | 60.0 | | | | | | | |
| NOAA | (b1) | 20.0 | 20.0 | 20.0 | 20.0 | 20.0 | 20.0 | 20.0 | 20.0 | 20.0 |
| FA-511AS | (b2) | 30.0 | 30.0 | | | | 30.0 | 30.0 | 30.0 | 30.0 |
| IB-XA | | | | | 30.0 | | | | | |
| 4HBA | | | | | | 30.0 | | | | |
| Miperon XM-220 | (C) | 20.0 | 20.0 | 20.0 | 20.0 | 20.0 | | 20.0 | 20.0 | 20.0 |
| PM-21 | (D) | 1.0 | 1.0 | 1.0 | 1.0 | 1.0 | 1.0 | | 1.0 | 1.0 |
| BD-1 | (E) | 2.0 | 2.0 | 2.0 | 2.0 | 2.0 | 2.0 | 2.0 | | |
| DPMP | | | | | | | | | | 2.0 |
| Rheocin | (f1) | 3.0 | 3.0 | 3.0 | 3.0 | 3.0 | 3.0 | 3.0 | 3.0 | 3.0 |
| NKC130 | (f2) | 5.0 | 5.0 | 5.0 | 5.0 | 5.0 | 5.0 | 5.0 | 5.0 | 5.0 |
| Omnirad 184 | (G) | 3.0 | 3.0 | 3.0 | 3.0 | 3.0 | 3.0 | 3.0 | 3.0 | 3.0 |
| BHT | (H) | 0.1 | 0.1 | 0.1 | 0.1 | 0.1 | 0.1 | 0.1 | 0.1 | 0.1 |
| Irganox 1010 | (i1) | | | | | | | | | |
| TINUVIN 249 | (i2) | | | | | | | | | |
| Total | | 144.1 | 144.1 | 114.1 | 144.1 | 144.1 | 124.1 | 143.1 | 142.1 | 144.1 |

EP400V in Tables 1 and 2 represents EPION EP400V (trade name: manufactured by Kaneka Corporation). EPION EP400V is an acryloyl-terminated polyisobutylene. EPION EP400V corresponds to the (A) component.

UC-203 (trade name: manufactured by Kuraray Co., Ltd.) in Tables 1 and 2 is methacrylic-modified polyisoprene. Mn of UC-203 is 35,000.

TE-2000 (trade name: manufactured by Nippon Soda Co., Ltd.) in Tables 1 and 2 is a terminal acrylic group polybutadiene. Mn of TE-2000 is 2,500.

NOAA (trade name: manufactured by Osaka Organic Chemical Industry Ltd.) in Tables 1 and 2 is n-octyl acrylate. NOAA corresponds to the (B) component and the (b1) component. NOAA is a chain skeleton alkyl (meth)acrylate of C8.

FA-511AS (trade name: manufactured by Hitachi Chemical Company, Ltd.) in Tables 1 and 2 is dicyclopentenyl acrylate. FA-511AS corresponds to the (B) component and the (b2) component.

IB-XA (trade name: manufactured by Osaka Organic Chemical Industry Ltd.) in Tables 1 and 2 is isobornyl acrylate. IB-XA corresponds to a monofunctional monomer.

4HBA (trade name: manufactured by Osaka Organic Chemical Industry Ltd.) in Tables 1 and 2 is 4-hydroxybutyl acrylate. 4HBA corresponds to a monofunctional monomer.

Miperon XM-200 (trade name: manufactured by Mitsui Chemicals, Inc.) in Tables 1 and 2 is a polyethylene powder. Miperon XM-200 corresponds to the (C) component. An average molecular weight of Miperon XM-200 is 2 million. The average particle size of Miperon XM-200 is 30 μm. The method of measuring the average particle size is a coulter counter method.

PM-21 (trade name: manufactured by Nippon Kayaku Co., Ltd.) in Tables 1 and 2 is a phosphate ester. PM-21 corresponds to the (D) component.

BD1 in Tables 1 and 2 represents KARENZ MT-BD1 (trade name: manufactured by Showa Denko K.K.). KARENZ MT-BD1 is 1,4-bis(3-mercaptobutylyloxy)butane. KARENZ MT-BD1 corresponds to the (E) component.

DPMP (trade name: manufactured by SC Organic Chemical Co., Ltd.) in Tables 1 and 2 is dipentaerythritol hexakis (3-mercaptopropionate). DPMP corresponds to a polyfunctional primary thiol.

Rheocin (trade name: manufactured by BYK) in Tables 1 and 2 corresponds to the (f1) component.

NKC130 (trade name: manufactured by Nippon Aerosil Co., Ltd.) in Tables 1 and 2 is hydrophobic fumed silica subjected to n-hexadecane surface treatment. NKC130 corresponds to the (f2) component. The primary average particle size of NKC130 is 16 nm.

Omnirad 184 (trade name: manufactured by IGM Resins) in Tables 1 and 2 corresponds to the α-hydroxyacetophenone-based (G) component.

BHT in Tables 1 and 2 represents dibutylhydroxytoluene. BHT corresponds to the (H) component.

Irganox 1010 (trade name: manufactured by BASF Japan Ltd.) in Tables 1 and 2 corresponds to the (i1) component.

TINUVIN 249 (trade name: manufactured by BASF Japan Ltd.) in Tables 1 and 2 corresponds to the (i2) component.

Each example illustrates the resin composition for HDD of the present disclosure. The resin composition for HDD of the present disclosure is not limited to the examples. Among the components shown in Tables 1 and 2, the component corresponding to the photo-curing component corresponds to the (A) component, the (b1) component, or the (b2) component.

The following evaluations were made on the resin compositions for HDD of each Example and each Comparative Example. Unless otherwise specified, the evaluation was performed under the conditions of 25° C. and 65% relative humidity.

Evaluation of surface curability: The resin composition for HDD was filled up to a top edge of a recess of a special mold. As a material of the special mold, PP was used. The shape of the recess was a cylindrical shape with a depth of 6 mm and a diameter of 26 mm.

Next, using a UV irradiation device UV LIGHT HAMMER 6Dbulb manufactured by FUSION UV System, light was irradiated under the conditions of an irradiation level of 300 mw/cm$^2$ and an accumulated luminous quantity of 6000 mJ/cm$^2$ to cure the resin composition for HDD. A tack on the surface of the cured product was evaluated by touching. When there was no tack, the evaluation result of the surface curability was marked as ○. When the tack remained, the evaluation result of the surface curability was marked as x.

Evaluation of type A hardness: A test piece was prepared from a resin composition for HDD. The type A hardness of the test piece was measured using a type A hardness tester manufactured by Teclock. The measurement method conformed to JIS K 6253. When a measured value of the type A hardness was 6 to 10 or exceeded 35, the evaluation result of the type A hardness was marked as ○. When the measured value of the type A hardness exceeded 10 and was 35 or less, the evaluation result of the type A hardness was marked as ⊙. When the measured value of the type A hardness was any other value, the evaluation result of the type A hardness was marked as x.

Evaluation of viscosity: A cone plate type viscometer RC-550 manufactured by Toki Sangyo Co., Ltd. was used. A cone angle was 3°. R was 7.7. The temperature at the time of measurement was 25±1° C.

First, the respective viscosities of the resin composition for HDD were measured under the condition that a rotation speed was 10 rpm (hereinafter referred to as the 10 rpm condition) and the condition that the rotation speed was 1 rpm (hereinafter referred to as the 1 rpm condition).

Next, of the 10 rpm condition and the 1 rpm condition, the condition in which an indicated value of the viscometer was 100% or less and was closer to 100% was selected. The selected condition was used as a first selection condition.

When the 10 rpm condition was the first selection condition, the 1 rpm condition was used as a second selection condition. A value obtained by dividing a viscosity value under the second selection condition by a viscosity value under the first selection condition was defined as the TI value. The TI value means the thixotropic value.

When the 1 rpm condition was the first selection condition, the viscosity of the resin composition for HDD was measured under the condition that the rotation speed was 0.1 rpm (hereinafter referred to as the 0.1 rpm condition). The 0.1 rpm condition was used as the second selection condition. A value obtained by dividing a viscosity value under the second selection condition by a viscosity value under the first selection condition was defined as the TI value.

When the indicated value of the viscometer exceeded 100% under both the 10 rpm condition and the 1 rpm condition, the viscosity of the resin composition for HDD was measured under each of the 0.1 rpm condition and the condition that the rotation speed was 0.01 rpm (hereinafter referred to as the 0.01 rpm condition).

Next, of the 0.1 rpm condition and the 0.01 rpm condition, the condition in which the indicated value of the viscometer was 100% or less and was closer to 100% was selected. The selected condition was used as a first selection condition.

When the 0.1 rpm condition was the first selection condition, the 0.01 rpm condition was used as the second selection condition. A value obtained by dividing a viscosity value under the second selection condition by a viscosity value under the first selection condition was defined as the TI value.

Evaluation of elastic modulus: A test piece was prepared using a resin composition for HDD. The shape of the test piece was a No. 8 dumbbell shape. The thickness of the test piece was 1 mm. The test piece was irradiated with ultraviolet rays and cured. The ultraviolet rays were irradiated using the irradiation device used in the evaluation of surface curability. The ultraviolet irradiation level was 300 mw/cm$^2$. The accumulated luminous quantity ultraviolet ray was 6000 mJ/cm$^2$.

Using Technograph TGI-1KgN manufactured by Minebea Co., Ltd., the elastic modulus of the cured test piece was measured in accordance with JIS K 6251. Crosshead speed was 10 mm/min.

When a measured value of the elastic modulus was 0.3 to 10 MPa, the evaluation result of the elastic modulus was marked as ○. When the measured value of the elastic modulus was any other value, the evaluation result of the elastic modulus was marked as x.

Evaluation of strength: The maximum strength of the elastic modulus measured in the evaluation of the elastic modulus was defined as the strength of the resin composition for HDD.

Evaluation of breaking strain: The breaking strain measured in the evaluation of the elastic modulus was defined as the breaking strain of the resin composition for HDD. When a measured value of the breaking strain was 100% or more, the evaluation result of the breaking strain was marked as ◯. When the measured value of the breaking strain was 150 to 1,000%, the evaluation result of the breaking strain was marked as ⊚. When the measured value of the breaking strain was less than 100%, the evaluation result of the breaking strain was marked as x.

Evaluation of moisture permeability: A sample with a thickness of 0.5 mm was prepared using a resin composition for HDD. The sample was irradiated with ultraviolet rays and cured. The ultraviolet rays were irradiated using the irradiation device used in the evaluation of surface curability. The ultraviolet irradiation level was 300 mw/cm². The accumulated luminous quantity ultraviolet ray was 6000 mJ/cm².

The moisture permeability of the cured sample was measured according to JIS Z 0208. The sample was left to stand for 24 hours under the environment of 60° C. and 90% RH. The moisture permeability was calculated from a change in mass of the sample before and after leaving the sample to stand. When the moisture permeability was 40 or less, the evaluation result of the moisture permeability was marked as ◯. When the moisture permeability was 30 or less, the evaluation result of the moisture permeability was marked as ⊚. When the moisture permeability exceeded 40, the evaluation result of the moisture permeability was marked as x.

Evaluation of outgas generation: 50 mg of the cured resin composition for HDD was placed in a chamber having a capacity of 300 ml and heated at a temperature of 80° C. for 1 hour. A gas emitted from the resin composition for HDD was adsorbed on a column attached to the chamber. Then, the gas adsorbed on the column was analyzed by gas chromatography. When camphene was detected as a result of the analysis, the evaluation result of outgas generation was marked as x. When no camphene was detected, the evaluation result of outgas generation was marked as ◯.

Evaluation of preservation: The initial viscosity of the resin composition for HDD was measured. The initial viscosity was measured under the first selection condition in the evaluation of viscosity described above. Next, the resin composition for HDD was left to stand in an environment of 60° C. for 3 days. Next, after the temperature of the resin composition for HDD was returned to 25±1° C., the viscosity of the resin composition for HDD was measured again under the same conditions as when the initial viscosity was measured. When the viscosity of the resin composition for HDD was measured again, the viscosity was the viscosity after leaving to stand. A ratio of the viscosity after leaving to stand to the initial viscosity was defined as the thickening ratio. When the thickening ratio was 2.5 times or less, the evaluation result of preservation was marked as ◯. When the thickening ratio exceeded 2.5 times, the evaluation result of preservation was marked as x.

The TI value was measured by the same method as the method of measuring the TI value in the evaluation of viscosity described above.

The evaluation results of the resin compositions for HDD of Examples and Comparative Examples are shown in Tables 3 and 4.

TABLE 3

| Evaluation contents | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Type A hardness | 22 | 25 | 32 | 46 | 10 | 22 | 34 | 30 | 32 | 34 | 29 |
| Evaluation of type A hardness | ⊚ | ⊚ | ⊚ | ◯ | ⊚ | ⊚ | ⊚ | ⊚ | ⊚ | ⊚ | ⊚ |
| Surface curability | ◯ | ◯ | ◯ | ◯ | ◯ | ◯ | ◯ | ◯ | ◯ | ◯ | ◯ |
| 1 rpm (mPa·s) or 0.1 or 0.01 rpm | 3,789,000 | 31,570 | 94,710 | 130,000 | 66,900 | 96,220 | 573,100 | 126,300 | 149,600 | 87,200 | 62,390 |
| 10 rpm (mPa·s) or 1 or 0.1 rpm | 1,457,000 | 6,014 | 22,400 | 32,100 | 12,700 | 21,720 | 131,200 | 25,780 | 26,910 | 20,820 | 15,790 |
| TI value | 2.6 | 5.2 | 4.2 | 4.0 | 5.3 | 4.4 | 4.4 | 4.9 | 5.6 | 4.2 | 4.0 |
| Evaluation of viscosity | ◯ | ◯ | ◯ | ◯ | ◯ | ◯ | ◯ | ◯ | ◯ | ◯ | ◯ |
| Elastic modulus (MPa) | 1.3 | 1.5 | 2.4 | 4.9 | 0.4 | 1.7 | 4.3 | 1.3 | 1.4 | 3.0 | 1.9 |
| Evaluation of elastic modulus | ◯ | ◯ | ◯ | ◯ | ◯ | ◯ | ◯ | ◯ | ◯ | ◯ | ◯ |
| Strength | 0.7 | 0.9 | 1.1 | 2.6 | 0.5 | 1.2 | 1.1 | 1.2 | 1.0 | 1.1 | 0.8 |
| Breaking strain (%) | 192 | 104 | 171 | 211 | 351 | 197 | 128 | 194 | 176 | 173 | 166 |
| Evaluation of breaking strain | ◯ | ◯ | ◯ | ◯ | ◯ | ◯ | ◯ | ◯ | ◯ | ◯ | ◯ |
| Moisture permeability (g/m²) | 5 | 35 | 13 | 11 | 28 | 14 | 13 | 15 | 12 | 14 | 16 |
| Evaluation of moisture permeability | ⊚ | ◯ | ⊚ | ⊚ | ⊚ | ⊚ | ⊚ | ⊚ | ⊚ | ⊚ | ⊚ |
| Outgas (camphene) | ◯ | ◯ | ◯ | ◯ | ◯ | ◯ | ◯ | ◯ | ◯ | ◯ | ◯ |
| Initial viscosity (mPa·s) | 12,100,000 | 42,850 | 118,800 | 77,430 | 130,400 | 94,710 | 683,400 | 129,300 | 251,800 | 92,460 | 39,090 |
| Viscosity after leaving to stand (mPa·s) | 3,240,000 | 13,030 | 25,930 | 30,140 | 30,740 | 26,710 | 236,400 | 28,870 | 48,410 | 27,960 | 13,680 |
| Thickening ratio | 222% | 217% | 116% | 94% | 242% | 123% | 180% | 112% | 180% | 134% | 87% |

TABLE 3-continued

| Evaluation contents | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| TI value | 3.7 | 3.3 | 4.6 | 2.6 | 4.2 | 3.5 | 2.9 | 4.5 | 5.2 | 3.3 | 2.9 |
| Evaluation of preservation | ○ | ○ | ◎ | ◎ | ○ | ◎ | ○ | ◎ | ○ | ◎ | ○ |

TABLE 4

| Evaluation contents | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Type A hardness | 45 | 90 | 4 | 4 | Incompatible | 27 | 30 | 46 | 46 |
| Evaluation of type A hardness | ○ | X | X | X | | ◎ | ◎ | ○ | ○ |
| Surface curability | ○ | ○ | ○ | ○ | | X | ○ | ○ | ○ |
| 1 rpm (mPa · s) or 0.01 or 0.01 rpm | 120,300 | 70,660 | 1,188,000 | 77,430 | | 97,720 | 79,680 | 97,720 | 63,140 |
| 10 rpm (mPa · s) or 1 or 0.1 rpm | 26,460 | 14,810 | 255,600 | 18,870 | | 20,220 | 20,150 | 23,750 | 15,940 |
| TI value | 4.5 | 4.8 | 4.6 | 4.1 | | 4.8 | 4.0 | 4.1 | 4.0 |
| Evaluation of viscosity | ○ | ○ | ○ | ○ | | ○ | ○ | ○ | ○ |
| Elastic modulus (MPa) | 4.2 | 62.9 | 0.5 | 0.6 | | 1.2 | 2.1 | 5.7 | 3.7 |
| Evaluation of elastic modulus | ○ | X | ○ | ○ | | ○ | ○ | ○ | ○ |
| Strength | 1.4 | 9.9 | 0.7 | 0.7 | | 1.1 | 0.9 | 1.9 | 1.5 |
| Breaking strain (%) | 52 | 30 | 861 | 913 | | 192 | 180 | 89 | 120 |
| Evaluation of breaking strain | X | X | ○ | ○ | | ○ | ○ | X | ○ |
| Moisture permeability (g/m$^2$) | 50 | 30 | 14 | 15 | | 19 | 14 | 12 | 13 |
| Evaluation of moisture permeability | X | ◎ | ◎ | ◎ | | ◎ | ◎ | ◎ | ◎ |
| Outgas (camphene) | ○ | ○ | ○ | X | | ○ | ○ | ○ | ○ |
| Initial viscosity (mPa · s) | 263,800 | 83,440 | 2,233,000 | 229,300 | | 61,640 | 275,900 | 179,700 | 1,097,000 |
| Viscosity after leaving to stand (mPa · s) | 47,660 | 20,150 | 745,700 | 52,240 | | 20,000 | 59,530 | 40,070 | 253,300 |
| Thickening ratio | 180% | 136% | 292% | 277% | | 99% | 295% | 169% | 1589% |
| TI value | 5.5 | 4.1 | 3.0 | 4.4 | | 3.1 | 4.6 | 4.5 | 4.3 |
| Evaluation of preservation | ○ | ◎ | X | X | | ◎ | X | ◎ | X |

Each example was good in type A hardness, surface curability, viscosity, elastic modulus, strength, breaking strain, moisture permeability, outgas generation, and preservation.

"1 rpm (mPa·s) or 0.1 or 0.01 rpm" in Tables 3 and 4 represents the second selection condition in the evaluation of viscosity. "10 rpm (mPa·s) or 1 or 0.1 rpm" in Tables 3 and 4 represents the first selection condition in the evaluation of viscosity.

Thus, the resin composition for HDD of the present disclosure is excellent in preservation and has a low moisture permeability. By using the resin composition for HDD of the present disclosure, a stable sealing property can be ensured. Since the cured layer of the resin composition for HDD of the present disclosure is unlikely to generate outgas, the reliability of the HDD can be improved.

In Comparative Example 1 in which an oligomer was a methacrylic-modified polyisoprene-based oligomer, the evaluation results of breaking strain and moisture permeability were poor. In Comparative Example 2 in which an oligomer was a terminal acrylic group polybutadiene, the evaluation results of hardness, elastic modulus, and breaking strain were poor.

In Comparative Example 3 not containing the (b2) component, the evaluation results of hardness and preservation were poor. In Comparative Example 4 containing IBXA instead of the (b2) component, the evaluation results of hardness, outgas, and preservation were poor.

In Comparative Example 5 containing 4HBA instead of the (b2) component, the compatibility was poor. In Comparative Example not containing the (C) component, the evaluation result of surface curability was poor.

In Comparative Example 7 not containing the (D) component, the evaluation result of preservation was poor. In Comparative Example 8 not containing the (E) component, the evaluation result of breaking strain was poor. In Comparative Example 9 which did not contain the (E) component and contained primary thiol, the evaluation result of preservation was poor.

In addition to the resin composition for HDD described above, the present disclosure can be realized in various forms of hard disk drives such as a product containing the resin composition for HDD as a constitutional component, a method of producing the resin composition for HDD, and a method of manufacturing HDD.

The hard disk drive includes a housing member. The housing member is composed of a plurality of parts. A sealing member for sealing is formed between the parts. The sealing member for sealing is, for example, a cured product formed by applying the resin composition for HDD of the present disclosure.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A photocurable gasket resin composition for use in a hard disk drive, the photocurable gasket resin composition comprising:
   an acryloyl-terminated polyisobutylene;
   a monofunctional alkyl (meth)acrylate monomer;
   a polyethylene powder;
   a phosphate ester;
   a polyfunctional secondary thiol;
   a thixotropy-imparting agent; and
   a photopolymerization initiator; wherein
   the monofunctional alkyl (meth)acrylate monomer contains a chain skeleton alkyl (meth)acrylate of C8 to C18 and dicyclopentenyl acrylate; and
   the thixotropy-imparting agent contains a compound derived from castor oil.

2. The photocurable gasket resin composition according to claim 1, wherein the thixotropy-imparting agent further contains hydrophobic fumed silica.

3. The photocurable gasket resin composition according to claim 1, wherein the chain skeleton alkyl (meth)acrylate is octyl acrylate.

4. The photocurable gasket resin composition according to claim 1, wherein a mass ratio of the polyethylene powder to a total solid content of the photocurable gasket resin composition is about 5% by mass or more and about 35% by mass or less.

5. A hard disk drive comprising the photocurable gasket resin composition according to claim 1.

6. A hard disk drive comprising the photocurable gasket resin composition according to claim 2.

7. A hard disk drive comprising the photocurable gasket resin composition according to claim 3.

* * * * *